(12) United States Patent
Prahlad et al.

(10) Patent No.: US 8,725,964 B2
(45) Date of Patent: *May 13, 2014

(54) INTERFACE SYSTEMS AND METHODS FOR ACCESSING STORED DATA

(75) Inventors: Anand Prahlad, East Brunswick, NJ (US); Randy DeMeno, Staten Island, NY (US); Jeremy A. Schwartz, Red Bank, NJ (US); James J. McGuigan, Avon, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,584

(22) Filed: Sep. 7, 2012

(65) Prior Publication Data

US 2012/0330966 A1    Dec. 27, 2012

Related U.S. Application Data

(63) Continuation of application No. 13/328,920, filed on Dec. 16, 2011, now Pat. No. 8,266,397, which is a continuation of application No. 12/886,496, filed on Sep. 20, 2010, now Pat. No. 8,086,809, which is a continuation of application No. 11/777,823, filed on Jul. 13, 2007, now Pat. No. 7,802,067, which is a continuation of application No. 11/302,528, filed on Dec. 12, 2005, now Pat. No. 7,315,924, which is a continuation of application No. 09/774,302, filed on Jan. 30, 2001, now Pat. No. 7,003,641.

(60) Provisional application No. 60/179,343, filed on Jan. 31, 2000.

(51) Int. Cl.
    *G06F 17/30*      (2006.01)
    *G06F 12/00*      (2006.01)

(52) U.S. Cl.
    USPC ............. 711/161; 707/999.203; 707/999.204; 711/162; 711/163

(58) Field of Classification Search
    USPC ............ 707/999.203, 999.204; 711/161, 162, 711/163
    See application file for complete search history.

(56) References Cited

U.S. PATENT DOCUMENTS 4,296,465 A    10/1981   Lemak
4,686,620 A    8/1987    Ng (Continued)

FOREIGN PATENT DOCUMENTS

EP      0259912      3/1988
EP      0341230      11/1989

(Continued)

OTHER PUBLICATIONS

U.S. Appl. No. 13/485,473, filed May 13, 2012, Prahlad et al.

(Continued)

*Primary Examiner* — Reginald Bragdon
*Assistant Examiner* — Mehdi Namazi
(74) *Attorney, Agent, or Firm* — Knobbe Martens Olson & Bear LLP

(57) ABSTRACT

A modular data and storage management system. The system includes a time variance interface that provides for storage into a storage media of data that is received over time. The time variance interface of the modular data and storage management system provides for retrieval, from the storage media, of an indication of the data corresponding to a user specified date. The retrieved indication of the data provides a user with an option to access specific information relative to the data, such as content of files that are included in the data.

16 Claims, 8 Drawing Sheets

(56) References Cited

U.S. PATENT DOCUMENTS

| | | |
|---|---|---|
| 4,751,639 A | 6/1988 | Corcoran et al. |
| 4,995,035 A | 2/1991 | Cole et al. |
| 5,005,122 A | 4/1991 | Griffin et al. |
| 5,093,912 A | 3/1992 | Dong et al. |
| 5,125,075 A | 6/1992 | Goodale et al. |
| 5,133,065 A | 7/1992 | Cheffetz et al. |
| 5,140,683 A | 8/1992 | Gallo et al. |
| 5,163,148 A | 11/1992 | Walls |
| 5,193,154 A | 3/1993 | Kitajima et al. |
| 5,204,958 A | 4/1993 | Cheng et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,321,816 A | 6/1994 | Rogan et al. |
| 5,333,251 A | 7/1994 | Urabe et al. |
| 5,333,315 A | 7/1994 | Saether et al. |
| 5,347,653 A | 9/1994 | Flynn et al. |
| 5,386,545 A | 1/1995 | Gombos, Jr. et al. |
| 5,387,459 A | 2/1995 | Hung |
| 5,410,700 A | 4/1995 | Fecteau et al. |
| 5,426,284 A | 6/1995 | Doyle |
| 5,448,718 A | 9/1995 | Cohn et al. |
| 5,448,724 A | 9/1995 | Hayashi et al. |
| 5,455,926 A | 10/1995 | Keele et al. |
| 5,485,606 A | 1/1996 | Midgdey et al. |
| 5,491,810 A | 2/1996 | Allen |
| 5,495,607 A | 2/1996 | Pisello et al. |
| 5,504,873 A | 4/1996 | Martin et al. |
| 5,537,568 A | 7/1996 | Yanai et al. |
| 5,544,345 A | 8/1996 | Carpenter et al. |
| 5,544,347 A | 8/1996 | Yanai et al. |
| 5,555,404 A | 9/1996 | Torbjornsen et al. |
| 5,559,957 A | 9/1996 | Balk |
| 5,559,991 A | 9/1996 | Kanfi |
| 5,564,037 A | 10/1996 | Lam |
| 5,574,898 A | 11/1996 | Leblang et al. |
| 5,598,546 A | 1/1997 | Blomgren |
| 5,608,865 A | 3/1997 | Midgely et al. |
| 5,613,134 A | 3/1997 | Lucus et al. |
| 5,615,392 A | 3/1997 | Harrison et al. |
| 5,619,644 A | 4/1997 | Crockett et al. |
| 5,634,052 A | 5/1997 | Morris |
| 5,638,509 A | 6/1997 | Dunphy et al. |
| 5,642,496 A | 6/1997 | Kanfi |
| 5,649,185 A | 7/1997 | Antognini et al. |
| 5,659,614 A | 8/1997 | Bailey |
| 5,666,501 A | 9/1997 | Jones et al. |
| 5,673,381 A | 9/1997 | Huai et al. |
| 5,673,382 A | 9/1997 | Cannon et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,699,361 A | 12/1997 | Ding et al. |
| 5,719,786 A | 2/1998 | Nelson et al. |
| 5,729,743 A | 3/1998 | Squibb |
| 5,734,817 A | 3/1998 | Roffe et al. |
| 5,737,747 A | 4/1998 | Vishlitzky et al. |
| 5,740,405 A | 4/1998 | DeGraaf |
| 5,742,807 A | 4/1998 | Masinter |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,761,734 A | 6/1998 | Pfeffer et al. |
| 5,764,972 A | 6/1998 | Crouse et al. |
| 5,778,165 A | 7/1998 | Saxon |
| 5,778,395 A | 7/1998 | Whiting et al. |
| 5,790,828 A | 8/1998 | Jost |
| 5,805,920 A | 9/1998 | Sprenkle et al. |
| 5,806,058 A | 9/1998 | Mori et al. |
| 5,812,398 A | 9/1998 | Nielsen |
| 5,812,748 A | 9/1998 | Ohran et al. |
| 5,813,009 A | 9/1998 | Johnson et al. |
| 5,813,013 A | 9/1998 | Shakib et al. |
| 5,813,017 A | 9/1998 | Morris |
| 5,829,046 A | 10/1998 | Tzelnic et al. |
| 5,835,953 A | 11/1998 | Ohran |
| 5,845,257 A | 12/1998 | Fu et al. |
| 5,860,073 A | 1/1999 | Ferrel et al. |
| 5,860,104 A | 1/1999 | Witt et al. |
| 5,864,846 A | 1/1999 | Voorhees et al. |
| 5,864,871 A | 1/1999 | Kitain et al. |
| 5,875,478 A | 2/1999 | Blumenau |
| 5,875,481 A | 2/1999 | Ashton et al. |
| 5,878,230 A | 3/1999 | Weber et al. |
| 5,881,311 A | 3/1999 | Woods |
| 5,884,067 A | 3/1999 | Storm et al. |
| 5,887,134 A | 3/1999 | Ebrahim |
| 5,893,139 A | 4/1999 | Kamiyama |
| 5,896,531 A | 4/1999 | Curtis et al. |
| 5,897,642 A | 4/1999 | Capossela et al. |
| 5,898,431 A | 4/1999 | Webster et al. |
| 5,901,327 A | 5/1999 | Ofek |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |
| 5,956,733 A | 9/1999 | Nakano et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,978,841 A | 11/1999 | Berger |
| 5,983,239 A | 11/1999 | Cannon |
| 5,987,478 A | 11/1999 | See et al. |
| 5,991,753 A | 11/1999 | Wilde |
| 5,995,091 A | 11/1999 | Near et al. |
| 6,000,020 A | 12/1999 | Chin et al. |
| 6,003,089 A | 12/1999 | Shaffer et al. |
| 6,009,274 A | 12/1999 | Fletcher et al. |
| 6,012,053 A | 1/2000 | Pant et al. |
| 6,012,090 A | 1/2000 | Chung et al. |
| 6,012,415 A | 1/2000 | Linseth |
| 6,016,553 A | 1/2000 | Schneider et al. |
| 6,018,744 A | 1/2000 | Mamiya et al. |
| 6,021,415 A | 2/2000 | Cannon et al. |
| 6,023,710 A | 2/2000 | Steiner et al. |
| 6,026,414 A | 2/2000 | Anglin |
| 6,026,437 A | 2/2000 | Muschett et al. |
| 6,052,735 A | 4/2000 | Ulrich et al. |
| 6,064,821 A | 5/2000 | Shough et al. |
| 6,070,228 A | 5/2000 | Belknap et al. |
| 6,073,128 A | 6/2000 | Pongracz et al. |
| 6,073,137 A | 6/2000 | Brown et al. |
| 6,073,220 A | 6/2000 | Gunderson |
| 6,076,148 A | 6/2000 | Kedem et al. |
| 6,078,934 A | 6/2000 | Lahey et al. |
| 6,085,030 A | 7/2000 | Whitehead et al. |
| 6,088,694 A | 7/2000 | Burns et al. |
| 6,091,518 A | 7/2000 | Anabuki |
| 6,094,416 A | 7/2000 | Ying |
| 6,101,585 A | 8/2000 | Brown et al. |
| 6,105,037 A | 8/2000 | Kishi |
| 6,105,129 A | 8/2000 | Meier et al. |
| 6,108,640 A | 8/2000 | Slotznick |
| 6,108,712 A | 8/2000 | Hayes, Jr. |
| 6,112,239 A | 8/2000 | Kenner et al. |
| 6,122,668 A | 9/2000 | Teng et al. |
| 6,131,095 A | 10/2000 | Low et al. |
| 6,131,190 A | 10/2000 | Sidwell |
| 6,137,864 A | 10/2000 | Yaker |
| 6,148,377 A | 11/2000 | Carter et al. |

(56) References Cited

U.S. PATENT DOCUMENTS

| | | | |
|---|---|---|---|
| 6,148,412 A | 11/2000 | Cannon et al. | |
| 6,154,787 A | 11/2000 | Urevig et al. | |
| 6,154,852 A | 11/2000 | Amundson et al. | |
| 6,161,111 A | 12/2000 | Mutalik et al. | |
| 6,161,192 A | 12/2000 | Lubbers et al. | |
| 6,167,402 A | 12/2000 | Yeager | |
| 6,175,829 B1 | 1/2001 | Li et al. | |
| 6,182,198 B1 | 1/2001 | Hubis et al. | |
| 6,189,051 B1 | 2/2001 | Oh et al. | |
| 6,212,512 B1 | 4/2001 | Barney et al. | |
| 6,212,521 B1 | 4/2001 | Minami et al. | |
| 6,226,759 B1 | 5/2001 | Miller et al. | |
| 6,230,164 B1 | 5/2001 | Rekieta et al. | |
| 6,249,795 B1 | 6/2001 | Douglis | |
| 6,253,217 B1 | 6/2001 | Dourish et al. | |
| 6,260,069 B1 | 7/2001 | Anglin | |
| 6,263,368 B1 | 7/2001 | Martin | |
| 6,266,679 B1 | 7/2001 | Szalwinski et al. | |
| 6,266,784 B1 | 7/2001 | Hsiao et al. | |
| 6,269,382 B1 | 7/2001 | Cabrera et al. | |
| 6,269,431 B1 | 7/2001 | Dunham | |
| 6,275,953 B1 | 8/2001 | Vahalia et al. | |
| 6,292,783 B1 | 9/2001 | Rohler | |
| 6,295,541 B1 | 9/2001 | Bodnar | |
| 6,298,439 B1 | 10/2001 | Beglin | |
| 6,301,592 B1 | 10/2001 | Aoyama et al. | |
| 6,304,880 B1 | 10/2001 | Kishi | |
| 6,314,439 B1 | 11/2001 | Bates et al. | |
| 6,314,460 B1 | 11/2001 | Knight et al. | |
| 6,324,581 B1 | 11/2001 | Xu et al. | |
| 6,327,590 B1 | 12/2001 | Chidlovskii et al. | |
| 6,327,612 B1 | 12/2001 | Watanabe | |
| 6,328,766 B1 | 12/2001 | Long | |
| 6,330,570 B1 | 12/2001 | Crighton | |
| 6,330,572 B1 | 12/2001 | Sitka | |
| 6,330,589 B1 | 12/2001 | Kennedy | |
| 6,330,642 B1 | 12/2001 | Carteau | |
| 6,341,287 B1 | 1/2002 | Sziklai et al. | |
| 6,343,287 B1 | 1/2002 | Kumar et al. | |
| 6,343,324 B1 | 1/2002 | Hubis et al. | |
| 6,345,288 B1 | 2/2002 | Reed et al. | |
| 6,350,199 B1 | 2/2002 | Williams et al. | |
| 6,351,763 B1 | 2/2002 | Kawanaka | |
| 6,351,764 B1 | 2/2002 | Voticky et al. | |
| RE37,601 E | 3/2002 | Eastridge et al. | |
| 6,353,878 B1 | 3/2002 | Dunham | |
| 6,356,801 B1 | 3/2002 | Goodman et al. | |
| 6,356,863 B1 | 3/2002 | Sayle | |
| 6,360,306 B1 | 3/2002 | Bergsten | |
| 6,363,462 B1 | 3/2002 | Bergsten | |
| 6,367,029 B1 | 4/2002 | Mayhead et al. | |
| 6,367,073 B2 | 4/2002 | Elledge | |
| 6,374,336 B1 | 4/2002 | Peters et al. | |
| 6,374,363 B1 | 4/2002 | Wu et al. | |
| 6,389,432 B1 | 5/2002 | Pothapragada et al. | |
| 6,396,513 B1 | 5/2002 | Helfman et al. | |
| 6,397,308 B1 | 5/2002 | Ofek et al. | |
| 6,418,478 B1 | 7/2002 | Ignatius et al. | |
| 6,421,709 B1 | 7/2002 | McCormick et al. | |
| 6,421,711 B1 | 7/2002 | Blumenau et al. | |
| 6,438,595 B1 | 8/2002 | Blumenau et al. | |
| 6,442,600 B1 | 8/2002 | Anderson | |
| 6,442,706 B1 | 8/2002 | Wahl et al. | |
| 6,453,325 B1 | 9/2002 | Cabrera et al. | |
| 6,466,592 B1 | 10/2002 | Chapman | |
| 6,470,332 B1 | 10/2002 | Weschler | |
| 6,473,794 B1 | 10/2002 | Guheen et al. | |
| 6,484,162 B1 | 11/2002 | Edlund et al. | |
| 6,487,561 B1 | 11/2002 | Ofek et al. | |
| 6,487,644 B1 | 11/2002 | Huebsch et al. | |
| 6,493,811 B1 | 12/2002 | Blades et al. | |
| 6,502,205 B1 | 12/2002 | Yanai et al. | |
| 6,519,679 B2 | 2/2003 | Devireddy et al. | |
| 6,535,910 B1 | 3/2003 | Suzuki et al. | |
| 6,538,669 B1 | 3/2003 | Lagueux, Jr. et al. | |
| 6,540,623 B2 | 4/2003 | Jackson | |
| 6,542,909 B1 | 4/2003 | Tamer et al. | |
| 6,542,972 B2 | 4/2003 | Ignatius et al. | |
| 6,546,545 B1 | 4/2003 | Honarvar et al. | |
| 6,549,918 B1 | 4/2003 | Probert et al. | |
| 6,553,410 B2 | 4/2003 | Kikinis | |
| 6,557,039 B1 | 4/2003 | Leong et al. | |
| 6,564,219 B1 | 5/2003 | Lee et al. | |
| 6,564,228 B1 | 5/2003 | O'Connor | |
| 6,581,143 B2 | 6/2003 | Gagne et al. | |
| 6,593,656 B2 | 7/2003 | Ahn et al. | |
| 6,604,149 B1 | 8/2003 | Deo et al. | |
| 6,615,241 B1 | 9/2003 | Miller et al. | |
| 6,618,771 B1 | 9/2003 | Leja et al. | |
| 6,629,110 B2 | 9/2003 | Cane et al. | |
| 6,631,493 B2 | 10/2003 | Ottesen et al. | |
| 6,647,396 B2 | 11/2003 | Parnell et al. | |
| 6,647,399 B2 | 11/2003 | Zaremba | |
| 6,647,409 B1 | 11/2003 | Sherman et al. | |
| 6,654,825 B2 | 11/2003 | Clapp et al. | |
| 6,658,436 B2 | 12/2003 | Oshinsky et al. | |
| 6,658,526 B2 | 12/2003 | Nguyen et al. | |
| 6,675,177 B1 | 1/2004 | Webb | |
| 6,704,933 B1 | 3/2004 | Tanaka et al. | |
| 6,721,767 B2 | 4/2004 | De Meno et al. | |
| 6,721,784 B1 | 4/2004 | Leonard et al. | |
| 6,728,733 B2 | 4/2004 | Tokui | |
| 6,732,088 B1 | 5/2004 | Glance | |
| 6,732,124 B1 | 5/2004 | Koseki et al. | |
| 6,732,231 B1 | 5/2004 | Don et al. | |
| 6,732,244 B2 | 5/2004 | Ashton et al. | |
| 6,742,092 B1 | 5/2004 | Huebsch et al. | |
| 6,745,178 B1 | 6/2004 | Emens et al. | |
| 6,757,794 B2 | 6/2004 | Cabrera et al. | |
| 6,760,723 B2 | 7/2004 | Oshinsky et al. | |
| 6,763,351 B1 | 7/2004 | Subramaniam et al. | |
| 6,789,161 B1 | 9/2004 | Blendermann et al. | |
| 6,795,828 B2 | 9/2004 | Ricketts | |
| 6,816,941 B1 | 11/2004 | Carlson et al. | |
| 6,820,070 B2 | 11/2004 | Goldman et al. | |
| 6,839,741 B1 | 1/2005 | Tsai | |
| 6,839,803 B1 | 1/2005 | Loh et al. | |
| 6,850,994 B2 | 2/2005 | Gabryjelski et al. | |
| 6,860,422 B2 | 3/2005 | Hull et al. | |
| 6,865,568 B2 | 3/2005 | Chau | |
| 6,868,424 B2 | 3/2005 | Jones et al. | |
| 6,871,163 B2 | 3/2005 | Hiller et al. | |
| 6,871,182 B1 | 3/2005 | Winnard et al. | |
| 6,874,023 B1 | 3/2005 | Pennell et al. | |
| 6,886,020 B1 | 4/2005 | Zahavi et al. | |
| 6,892,221 B2 | 5/2005 | Ricart et al. | |
| 6,912,645 B2 | 6/2005 | Dorward et al. | |
| 6,941,304 B2 | 9/2005 | Gainey et al. | |
| 6,948,038 B2 | 9/2005 | Berkowitz et al. | |
| 6,952,758 B2 | 10/2005 | Chron et al. | |
| 6,957,186 B1 | 10/2005 | Guheen et al. | |
| 6,968,351 B2 | 11/2005 | Butterworth | |
| 6,970,997 B2 | 11/2005 | Shibayama et al. | |
| 6,973,553 B1 | 12/2005 | Archibald, Jr. et al. | |
| 6,976,039 B2 | 12/2005 | Chefalas et al. | |
| 6,978,265 B2 | 12/2005 | Schumacher | |
| 6,983,351 B2 | 1/2006 | Gibble et al. | |
| 6,995,675 B2 | 2/2006 | Curkendall et al. | |
| 6,996,616 B1 | 2/2006 | Leighton et al. | |
| 7,003,519 B1 | 2/2006 | Biettron et al. | |
| 7,003,641 B2 | 2/2006 | Prahlad et al. | |
| 7,028,079 B2 | 4/2006 | Mastrianni et al. | |
| 7,035,880 B1 | 4/2006 | Crescenti et al. | |
| 7,039,860 B1 | 5/2006 | Gautestad | |
| 7,058,661 B2 | 6/2006 | Ciaramitaro et al. | |
| 7,062,761 B2 | 6/2006 | Slavin et al. | |
| 7,076,685 B2 | 7/2006 | Pillai et al. | |
| 7,082,441 B1 | 7/2006 | Zahavi et al. | |
| 7,085,904 B2 | 8/2006 | Mizuno et al. | |
| 7,096,315 B2 | 8/2006 | Takeda et al. | |
| 7,099,901 B2 | 8/2006 | Sutoh et al. | |
| 7,103,731 B2 | 9/2006 | Gibble et al. | |
| 7,103,740 B1 | 9/2006 | Colgrove et al. | |
| 7,107,268 B1 * | 9/2006 | Zawadzki et al. | 1/1 |

(56) References Cited

U.S. PATENT DOCUMENTS

| | | | |
|---|---|---|---|
| 7,107,298 | B2 | 9/2006 | Prahlad et al. |
| 7,107,395 | B1 | 9/2006 | Ofek et al. |
| 7,107,416 | B2 | 9/2006 | Stuart et al. |
| 7,120,757 | B2 | 10/2006 | Tsuge |
| 7,130,970 | B2 | 10/2006 | Devassy et al. |
| 7,133,870 | B1 | 11/2006 | Tripp et al. |
| 7,134,041 | B2 | 11/2006 | Murray et al. |
| 7,139,826 | B2 | 11/2006 | Watanabe et al. |
| 7,146,387 | B1 | 12/2006 | Russo et al. |
| 7,149,893 | B1 | 12/2006 | Leonard et al. |
| 7,155,421 | B1 | 12/2006 | Haldar |
| 7,155,465 | B2 | 12/2006 | Lee et al. |
| 7,155,481 | B2 | 12/2006 | Prahlad et al. |
| 7,155,633 | B2 | 12/2006 | Tuma et al. |
| 7,159,081 | B2 | 1/2007 | Suzuki |
| 7,171,468 | B2 | 1/2007 | Yeung et al. |
| 7,171,585 | B2 | 1/2007 | Gail et al. |
| 7,174,312 | B2 | 2/2007 | Harper et al. |
| 7,188,141 | B2 | 3/2007 | Novaes |
| 7,194,454 | B2 | 3/2007 | Hansen et al. |
| 7,240,100 | B1 | 7/2007 | Wein et al. |
| 7,246,140 | B2 | 7/2007 | Therrien et al. |
| 7,246,207 | B2 | 7/2007 | Kottomtharayil et al. |
| 7,269,612 | B2 | 9/2007 | Devarakonda et al. |
| 7,269,664 | B2 | 9/2007 | Hütsch et al. |
| 7,272,606 | B2 | 9/2007 | Borthakur et al. |
| 7,278,142 | B2 | 10/2007 | Bandhole et al. |
| 7,287,047 | B2 | 10/2007 | Kavuri |
| 7,290,017 | B1 | 10/2007 | Wang et al. |
| 7,293,133 | B1 | 11/2007 | Colgrove et al. |
| 7,313,659 | B2 | 12/2007 | Suzuki |
| 7,315,923 | B2 | 1/2008 | Retnamma et al. |
| 7,315,924 | B2 | 1/2008 | Prahlad et al. |
| 7,328,225 | B1 | 2/2008 | Beloussov et al. |
| 7,328,325 | B1 | 2/2008 | Solis et al. |
| 7,343,356 | B2 | 3/2008 | Prahlad et al. |
| 7,343,365 | B2 | 3/2008 | Farnham et al. |
| 7,343,453 | B2 | 3/2008 | Prahlad et al. |
| 7,343,459 | B2 | 3/2008 | Prahlad et al. |
| 7,346,623 | B2 | 3/2008 | Prahlad et al. |
| 7,346,676 | B1 | 3/2008 | Swildens et al. |
| 7,346,751 | B2 | 3/2008 | Prahlad et al. |
| 7,356,657 | B2 | 4/2008 | Mikami |
| 7,359,917 | B2 | 4/2008 | Winter et al. |
| 7,376,947 | B2 | 5/2008 | Evers |
| 7,379,978 | B2 | 5/2008 | Anderson et al. |
| 7,380,072 | B2 | 5/2008 | Kottomtharayil et al. |
| 7,386,535 | B1 | 6/2008 | Kalucha et al. |
| 7,386,552 | B2 | 6/2008 | Kitamura et al. |
| 7,389,311 | B1 | 6/2008 | Crescenti et al. |
| 7,395,282 | B1 | 7/2008 | Crescenti et al. |
| 7,409,509 | B2 | 8/2008 | Devassy et al. |
| 7,424,543 | B2 | 9/2008 | Rice, III |
| 7,430,587 | B2 | 9/2008 | Malone et al. |
| 7,433,301 | B2 | 10/2008 | Akahane et al. |
| 7,434,219 | B2 | 10/2008 | De Meno et al. |
| 7,447,692 | B2 | 11/2008 | Oshinsky et al. |
| 7,454,569 | B2 | 11/2008 | Kavuri et al. |
| 7,457,790 | B2 | 11/2008 | Kochunni et al. |
| 7,467,167 | B2 | 12/2008 | Patterson |
| 7,472,142 | B2 | 12/2008 | Prahlad et al. |
| 7,472,238 | B1 | 12/2008 | Gokhale |
| 7,484,054 | B2 | 1/2009 | Kottomtharayil et al. |
| 7,490,207 | B2 | 2/2009 | Amarendran |
| 7,496,589 | B1 | 2/2009 | Jain et al. |
| 7,496,841 | B2 | 2/2009 | Hadfield et al. |
| 7,500,053 | B1 | 3/2009 | Kavuri et al. |
| 7,500,150 | B2 | 3/2009 | Sharma et al. |
| 7,509,316 | B2 | 3/2009 | Greenblatt et al. |
| 7,512,601 | B2 | 3/2009 | Cucerzan et al. |
| 7,519,726 | B2 | 4/2009 | Palliyll et al. |
| 7,523,483 | B2 | 4/2009 | Dogan |
| 7,529,748 | B2 | 5/2009 | Wen et al. |
| 7,532,340 | B2 | 5/2009 | Koppich et al. |
| 7,536,291 | B1 | 5/2009 | Retnamma et al. |
| 7,543,125 | B2 | 6/2009 | Gokhale |
| 7,546,324 | B2 | 6/2009 | Prahlad et al. |
| 7,565,484 | B2 | 7/2009 | Ghosal et al. |
| 7,577,689 | B1 | 8/2009 | Masinter et al. |
| 7,577,694 | B2 | 8/2009 | Nakano et al. |
| 7,581,077 | B2 | 8/2009 | Ignatius et al. |
| 7,584,469 | B2 | 9/2009 | Mitekura et al. |
| 7,587,715 | B1 | 9/2009 | Barrett et al. |
| 7,593,935 | B2 | 9/2009 | Sullivan |
| 7,596,586 | B2 | 9/2009 | Gokhale et al. |
| 7,596,713 | B2 | 9/2009 | Mani-Meitav |
| 7,603,626 | B2 | 10/2009 | Williams et al. |
| 7,606,844 | B2 | 10/2009 | Kottomtharayil |
| 7,610,285 | B1 | 10/2009 | Zoellner et al. |
| 7,613,748 | B2 | 11/2009 | Brockway et al. |
| 7,617,253 | B2 | 11/2009 | Prahlad et al. |
| 7,617,262 | B2 | 11/2009 | Prahlad et al. |
| 7,617,541 | B2 | 11/2009 | Plotkin et al. |
| 7,627,598 | B1 | 12/2009 | Burke |
| 7,627,617 | B2 | 12/2009 | Kavuri et al. |
| 7,636,743 | B2 | 12/2009 | Erofeev |
| 7,651,593 | B2 | 1/2010 | Prahlad et al. |
| 7,661,028 | B2 | 2/2010 | Erofeev |
| 7,668,798 | B2 | 2/2010 | Scanlon et al. |
| 7,668,884 | B2 | 2/2010 | Prahlad et al. |
| 7,673,175 | B2 | 3/2010 | Mora et al. |
| 7,676,542 | B2 | 3/2010 | Moser et al. |
| 7,685,126 | B2 | 3/2010 | Patel et al. |
| 7,689,899 | B2 | 3/2010 | Leymaster et al. |
| 7,716,171 | B2 | 5/2010 | Kryger |
| 7,730,031 | B2 | 6/2010 | Forster |
| 7,734,593 | B2 | 6/2010 | Prahlad et al. |
| 7,734,669 | B2 | 6/2010 | Kottomtharayil et al. |
| 7,734,715 | B2 | 6/2010 | Hyakutake et al. |
| 7,751,628 | B1 | 7/2010 | Reisman |
| 7,757,043 | B2 | 7/2010 | Kavuri et al. |
| 7,792,789 | B2 | 9/2010 | Prahlad et al. |
| 7,801,871 | B2 | 9/2010 | Gosnell |
| 7,802,067 | B2 | 9/2010 | Prahlad et al. |
| 7,814,118 | B2 | 10/2010 | Kottomtharayil et al. |
| 7,827,266 | B2 | 11/2010 | Gupta |
| 7,831,793 | B2 | 11/2010 | Chakravarty et al. |
| 7,840,537 | B2 | 11/2010 | Gokhale et al. |
| 7,844,676 | B2 | 11/2010 | Prahlad et al. |
| 7,865,517 | B2 | 1/2011 | Prahlad et al. |
| 7,870,355 | B2 | 1/2011 | Erofeev |
| 7,873,808 | B2 | 1/2011 | Stewart |
| 7,877,351 | B2 | 1/2011 | Crescenti et al. |
| 7,882,077 | B2 | 2/2011 | Gokhale et al. |
| 7,882,093 | B2 | 2/2011 | Kottomtharayil et al. |
| 7,890,718 | B2 | 2/2011 | Gokhale |
| 7,890,719 | B2 | 2/2011 | Gokhale |
| 7,937,393 | B2 | 5/2011 | Prahlad et al. |
| 7,937,420 | B2 | 5/2011 | Tabellion et al. |
| 7,937,702 | B2 | 5/2011 | De Meno et al. |
| 7,962,455 | B2 | 6/2011 | Erofeev |
| 7,984,063 | B2 | 7/2011 | Kottomtharayil et al. |
| 8,037,028 | B2 | 10/2011 | Prahlad et al. |
| 8,041,673 | B2 | 10/2011 | Crescenti et al. |
| 8,046,331 | B1 | 10/2011 | Sanghavi et al. |
| 8,055,627 | B2 | 11/2011 | Prahlad et al. |
| 8,060,514 | B2 | 11/2011 | Arrouye et al. |
| 8,078,583 | B2 | 12/2011 | Prahlad et al. |
| 8,086,809 | B2 | 12/2011 | Prahlad et al. |
| 8,103,670 | B2 | 1/2012 | Oshinsky et al. |
| 8,103,829 | B2 | 1/2012 | Kavuri et al. |
| 8,121,983 | B2 | 2/2012 | Prahlad et al. |
| 8,166,263 | B2 | 4/2012 | Prahlad |
| 8,204,859 | B2 | 6/2012 | Ngo |
| 8,214,444 | B2 | 7/2012 | Prahlad et al. |
| 8,219,524 | B2 | 7/2012 | Gokhale |
| 8,266,106 | B2 | 9/2012 | Prahlad et al. |
| 8,266,397 | B2 | 9/2012 | Prahlad et al. |
| 8,271,830 | B2 | 9/2012 | Erofeev |
| 8,352,433 | B2 | 1/2013 | Crescenti et al. |
| 8,402,219 | B2 | 3/2013 | Kavuri et al. |
| 8,433,679 | B2 | 4/2013 | Crescenti et al. |
| 8,504,634 | B2 | 8/2013 | Prahlad et al. |
| 8,566,278 | B2 | 10/2013 | Crescenti et al. |

(56) References Cited

U.S. PATENT DOCUMENTS

| | | |
|---|---|---|
| 8,577,844 B2 | 11/2013 | Prahlad et al. |
| 2002/0004883 A1 | 1/2002 | Nguyen et al. |
| 2002/0032878 A1 | 3/2002 | Karpf |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049778 A1 | 4/2002 | Bell et al. |
| 2002/0049883 A1 | 4/2002 | Schneider et al. |
| 2002/0069324 A1 | 6/2002 | Gerasimov et al. |
| 2002/0099690 A1 | 7/2002 | Schumacher |
| 2002/0103848 A1 | 8/2002 | Giacomini et al. |
| 2002/0107877 A1 | 8/2002 | Whiting et al. |
| 2002/0120858 A1 | 8/2002 | Porter et al. |
| 2002/0161753 A1 | 10/2002 | Inaba et al. |
| 2003/0046313 A1 | 3/2003 | Leung et al. |
| 2003/0050979 A1 | 3/2003 | Takahashi |
| 2003/0061491 A1 | 3/2003 | Jaskiewicz et al. |
| 2003/0097361 A1 | 5/2003 | Huang et al. |
| 2003/0101086 A1 | 5/2003 | San Miguel |
| 2003/0163399 A1 | 8/2003 | Harper et al. |
| 2003/0172158 A1 | 9/2003 | Pillai et al. |
| 2004/0039689 A1 | 2/2004 | Penney et al. |
| 2004/0107199 A1 | 6/2004 | Dairymple et al. |
| 2004/0193953 A1 | 9/2004 | Callahan et al. |
| 2004/0205206 A1 | 10/2004 | Naik et al. |
| 2004/0230829 A1 | 11/2004 | Dogan et al. |
| 2004/0267815 A1 | 12/2004 | De Mes |
| 2005/0033800 A1 | 2/2005 | Kavuri et al. |
| 2005/0039069 A1 | 2/2005 | Prahlad et al. |
| 2005/0044114 A1 | 2/2005 | Kottomtharayil et al. |
| 2005/0097070 A1 | 5/2005 | Enis et al. |
| 2005/0246510 A1 | 11/2005 | Retnamma et al. |
| 2005/0251786 A1 | 11/2005 | Citron et al. |
| 2005/0268068 A1 | 12/2005 | Ignatius et al. |
| 2005/0278207 A1 | 12/2005 | Ronnewinkel |
| 2006/0005048 A1 | 1/2006 | Osaki et al. |
| 2006/0010227 A1 | 1/2006 | Atluri |
| 2006/0036619 A1 | 2/2006 | Fuerst et al. |
| 2006/0070061 A1 | 3/2006 | Cox et al. |
| 2006/0115802 A1 | 6/2006 | Reynolds |
| 2006/0116999 A1 | 6/2006 | Dettinger et al. |
| 2006/0149604 A1 | 7/2006 | Miller |
| 2006/0149724 A1 | 7/2006 | Ritter et al. |
| 2006/0224846 A1 | 10/2006 | Amarendran et al. |
| 2006/0282900 A1 | 12/2006 | Johnson et al. |
| 2007/0022145 A1 | 1/2007 | Kavuri |
| 2007/0028229 A1 | 2/2007 | Knatcher |
| 2007/0043715 A1 | 2/2007 | Kaushik et al. |
| 2007/0043956 A1 | 2/2007 | El Far et al. |
| 2007/0061266 A1 | 3/2007 | Moore et al. |
| 2007/0061298 A1 | 3/2007 | Wilson et al. |
| 2007/0078913 A1 | 4/2007 | Crescenti et al. |
| 2007/0100867 A1 | 5/2007 | Celik et al. |
| 2007/0143756 A1 | 6/2007 | Gokhale |
| 2007/0166674 A1 | 7/2007 | Kochunni et al. |
| 2007/0183224 A1 | 8/2007 | Erofeev |
| 2007/0250810 A1 | 10/2007 | Tittizer et al. |
| 2007/0288536 A1 | 12/2007 | Sen et al. |
| 2007/0296258 A1 | 12/2007 | Calvert et al. |
| 2008/0059515 A1 | 3/2008 | Fulton |
| 2008/0229037 A1 | 9/2008 | Bunte et al. |
| 2008/0243855 A1 | 10/2008 | Prahlad et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0282048 A1 | 11/2008 | Miura |
| 2008/0288947 A1 | 11/2008 | Gokhale et al. |
| 2008/0288948 A1 | 11/2008 | Attarde et al. |
| 2008/0320319 A1 | 12/2008 | Muller et al. |
| 2009/0171883 A1 | 7/2009 | Kochunni et al. |
| 2009/0177719 A1 | 7/2009 | Kavuri |
| 2009/0228894 A1 | 9/2009 | Gokhale |
| 2009/0248762 A1 | 10/2009 | Prahlad et al. |
| 2009/0271791 A1 | 10/2009 | Gokhale |
| 2009/0319534 A1 | 12/2009 | Gokhale |
| 2009/0319585 A1 | 12/2009 | Gokhale |
| 2009/0320029 A1 | 12/2009 | Kottomtharayil |
| 2009/0320033 A1 | 12/2009 | Gokhale et al. |
| 2009/0320037 A1 | 12/2009 | Gokhale et al. |
| 2010/0031017 A1 | 2/2010 | Gokhale et al. |
| 2010/0049753 A1 | 2/2010 | Prahlad et al. |
| 2010/0070466 A1 | 3/2010 | Prahlad et al. |
| 2010/0070474 A1 | 3/2010 | Lad |
| 2010/0070725 A1 | 3/2010 | Prahlad et al. |
| 2010/0070726 A1 | 3/2010 | Ngo et al. |
| 2010/0076932 A1 | 3/2010 | Lad |
| 2010/0094808 A1 | 4/2010 | Erofeev |
| 2010/0100529 A1 | 4/2010 | Erofeev |
| 2010/0114837 A1 | 5/2010 | Prahlad et al. |
| 2010/0122053 A1 | 5/2010 | Prahlad et al. |
| 2010/0131461 A1 | 5/2010 | Prahlad et al. |
| 2010/0138393 A1 | 6/2010 | Crescenti et al. |
| 2010/0145909 A1 | 6/2010 | Ngo |
| 2010/0179941 A1 | 7/2010 | Agrawal et al. |
| 2010/0205150 A1 | 8/2010 | Prahlad et al. |
| 2011/0066817 A1 | 3/2011 | Kavuri et al. |
| 2011/0072097 A1 | 3/2011 | Prahlad et al. |
| 2011/0093471 A1 | 4/2011 | Brockway et al. |
| 2011/0173207 A1 | 7/2011 | Kottomtharayil et al. |
| 2012/0030177 A1 | 2/2012 | Crescenti et al. |
| 2012/0059797 A1 | 3/2012 | Prahlad et al. |
| 2012/0089800 A1 | 4/2012 | Prahlad et al. |
| 2012/0124042 A1 | 5/2012 | Oshinsky et al. |
| 2012/0124289 A1 | 5/2012 | Kavuri et al. |
| 2012/0331071 A1 | 12/2012 | Prahlad et al. |
| 2013/0006944 A1 | 1/2013 | Prahlad et al. |
| 2013/0007391 A1 | 1/2013 | Crescenti et al. |
| 2013/0254503 A1 | 9/2013 | Kavuri et al. |

FOREIGN PATENT DOCUMENTS

| | | |
|---|---|---|
| EP | 0381651 | 8/1990 |
| EP | 0405926 | 1/1991 |
| EP | 0467546 | 1/1992 |
| EP | 0599466 | 6/1994 |
| EP | 0670543 | 9/1995 |
| EP | 0717346 | 6/1996 |
| EP | 0774715 | 5/1997 |
| EP | 0809184 | 11/1997 |
| EP | 0862304 | 9/1998 |
| EP | 0899662 | 3/1999 |
| EP | 0910019 | 4/1999 |
| EP | 0981090 | 2/2000 |
| EP | 0986011 | 3/2000 |
| EP | 1035690 | 9/2000 |
| EP | 1174795 | 1/2002 |
| GB | 2216368 | 10/1989 |
| JP | 07-046271 | 2/1995 |
| JP | 07-073080 | 3/1995 |
| JP | 08-044598 | 2/1996 |
| JP | H11-102314 | 4/1999 |
| JP | H11-259459 | 9/1999 |
| JP | 2000-035969 | 2/2000 |
| JP | 2001-60175 | 3/2001 |
| JP | 2003-531435 | 10/2003 |
| WO | WO 94/17474 | 8/1994 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 99/23585 | 5/1999 |
| WO | WO 00/58865 | 10/2000 |
| WO | WO 01/04756 | 1/2001 |
| WO | WO 01/06368 | 1/2001 |
| WO | WO 01/16693 | 3/2001 |
| WO | WO 01/80005 | 10/2001 |
| WO | WO 2005/050381 | 6/2005 |

OTHER PUBLICATIONS

Armstead et al., "Implementation of a Campus-Wide Distributed Mass Storage Service: The Dream vs. Reality," IEEE, 1995, pp. 190-199.

(56) References Cited

OTHER PUBLICATIONS

Arneson, "Development of Omniserver; Mass Storage Systems," Control Data Corporation, 1990, pp. 88-93.
Arneson, "Mass Storage Archiving in Network Environments" IEEE, 1998, pp. 45-50.
Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Catapult, Inc., Microsoft Outlook 2000 Step by Step, Published May 7, 1999, "Collaborating with Others Using Outlook & Exchange", p. 8 including "Message Timeline.".
Communication in European Application No. 02 747 883.3, mailed Jul. 20, 2007).
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
http://en.wikipedia.org/wiki/Naive_Bayes_classifier, printed on Jun. 1, 2010, in 7 pages.
Jander, "Launching Storage-Area Net," Data Communications, US, McGraw Hill, NY, vol. 27, No. 4(Apr. 21, 1998), pp. 64-72.
Microsoft, about using Microsoft Excel 2000 files with earlier version Excel, 1985-1999, Microsoft, p. 1.
Rosenblum et al., "The Design and Implementation of a Log-Structure File System," Operating Systems Review SIGOPS, vol. 25, No. 5, New York, US, pp. 1-15 (May 1991).
Szor, The Art of Virus Research and Defense, Symantec Press (2005) ISBN 0-321- 30454-3, Part 1.
Szor, The Art of Virus Research and Defense, Symantec Press (2005) ISBN 0-321-30454-3, Part 2.
Toyoda, Fundamentals of Oracle 8i Backup and Recovery, DB Magazine, Japan, Shoeisha, Co., Ltd.; Jul. 2000; vol. 10, No. 4, 34 total pages.
Weatherspoon H. et al., "Silverback: A Global-Scale Archival System," Mar. 2001, pp. 1-15.
Witten et al., Data Mining: Practical Machine Learning Tools and Techniques, Ian H. Witten & Eibe Frank, Elsevier (2005) ISBN 0-12-088407-0, Part 1.
Witten et al., Data Mining: Practical Machine Learning Tools and Techniques, Ian H. Witten & Eibe Frank, Elsevier (2005) ISBN 0-12-088407-0, Part 2.
International Search Report dated Aug. 22, 2002, PCT/US2002/017973.
International Search Report dated Dec. 23, 2003, PCT/US2001/003088.
European Examination Report, Application No. 01906806.3-1244, dated Sep. 13, 2006, 3 pages.
Supplementary European Search Report, European Patent Application No. 02747883, Sep. 15, 2006; 2 pages.
Japanese Office Action dated Jul. 15, 2008, Application No. 2003/502696.
European Communication, Application No. 01906806.3, dated Sep. 21, 2010, 6 pages.
International Search Report and Preliminary Report on Patentability dated Feb. 21, 2002, PCT/US2001/003183.
European Office Action dated Mar. 26, 2008, EP019068337.
International Search Report and Preliminary Report on Patentability dated Sep. 29, 2001, PCT/US2001/003209.
International Search Report and Preliminary Report on Patentability dated Mar. 3, 2003, PCT/US2002/018169.
Supplementary European Search Report dated Sep. 21, 2006, EP02778952.8.
Translation of Japanese Office Action dated Mar. 25, 2008, Application No. 2003-504235.
European Office Action dated Apr. 22, 2008, EP02778952.8.
International Preliminary Report on Patentability dated May 15, 2006, PCT/US2004/038278 filed Nov. 15, 2004, (Publication No. WO2005/050381).
International Search Report dated Feb. 1, 2006, PCT/US2004/038278.
International Search Report and Preliminary Report on Patentability dated May 4, 2001, PCT/US2000/019363.
International Search Report dated Dec. 21, 2000, PCT/US2000/019324.
International Search Report on Patentability dated Dec. 21, 2000 in PCT/US00/19364 filed Nov. 14, 2000 (Publication No. WO01/04756).
International Search Report dated Dec. 21, 2000, PCT/US2000/019329.
Office Action in U.S. Appl. No. 13/485,473 dated Nov. 8, 2012.
Hsiao, et al., "Using a Multiple Storage Quad Tree on a Hierarchial VLSI Compaction Scheme", IEEE, 1990, pp. 1-15.

* cited by examiner

INTERFACE SYSTEMS AND METHODS FOR ACCESSING STORED DATA

RELATED APPLICATIONS

The present application is a continuation of U.S. patent application Ser. No. 13/328,920, filed on Dec. 16, 2011, now U.S. Pat. No. 8,266,397, issued Sep. 11, 2012, which is a continuation of U.S. patent application Ser. No. 12/886,496, filed Sep. 20, 2010, now U.S. Pat. No. 8,086,809, which is a continuation of U.S. patent application Ser. No. 11/777,823, filed Jul. 13, 2007, now U.S. Pat. No. 7,802,067, issued Sep. 21, 2010, which is a continuation of U.S. patent application Ser. No. 11/302,528, filed Dec. 12, 2005, now U.S. Pat. No. 7,315,924, issued Jan. 1, 2008, which is a continuation of U.S. patent application Ser. No. 09/774,302, filed on Jan. 30, 2001, now U.S. Pat. No. 7,003,641, issued Feb. 21, 2006, which is based on and claims the benefit of U.S. Provisional Patent Application No. 60/179,343, filed Jan. 31, 2000, each of which is hereby incorporated herein by reference in its entirety.

BACKGROUND OF THE INVENTION

1. Field of the Invention

The present invention generally relates to data storage in email systems and more particularly to the logical view with granular access to exchange data managed by a modular data and storage management system.

2. Description of the Related Art

Traditional methods have involved restoring the Microsoft Exchange Database in its entirety even if the goal of the operation was to restore just a single object (e-mail message). Such methods take much longer to accomplish operation (because of volume of data transferred during restores), require the Microsoft Exchange database to be taken offline, and may require extra disk storage to store a temporary copy of the restored data.

Many other problems and disadvantages of the prior art will become apparent to one skilled in the art after comparing such prior art with the present invention as described herein.

SUMMARY OF THE INVENTION

Various aspects of the present invention may be realized through a modular data and storage management system. The system includes a time variance interface that provides for storage into a storage media of data that is received over time. The time variance interface of the modular data and storage management system provides for retrieval, from the storage media, of an indication of the data corresponding to a user specified date. The retrieved indication of the data provides a user with an option to access specific information relative to the data, such as content of files that are included in the data.

In certain embodiments, the retrieved data of the modular data and storage management system is exchange data. A logical view of the retrieved data may be provided such that only a portion of the data is retrieved until specifically requested by a user. The logical view may create a state of the modular data and storage management system that corresponds to an earlier state of the system. The storage media is often divided into more than one subset of storage media to provide a separate location for the data during the time that it is stored. When the storage media is divided, the data may be migrated from one subset of storage media to another according to conditions such as length of time the data has been stored, type of data that has been stored, user that has stored the data, combinations of the specified conditions and similar conditions. The modular data and storage management system may also include a retrieval manager module having a master storage and backup map that is used to direct access to the data of the storage media such that data is retrieved only when specifically requested by the user.

Various aspects of the present invention may also be found in a method for a storage management system to display an index of stored data of a computer system. The method allows a user access to a state of the computer system on a user specified date, and involves, not necessarily in this order, the following: receiving data in the computer system; storing the data into a storage media via an organizational scheme that provides a separate storage location for various versions, if any, of the data; indexing the stored data according to the date that modifications were made to the data and according to the storage location of the data; specifying a date on which to view the state of the computer system; and retrieving the stored data that correspond to the state of the computer system on the specified date, the retrieved data including an option to retrieve additional data. if any, with respect to the retrieved data. The method could further include selecting the option to retrieve the additional data to thereby retrieve the additional data from the separate storage location of the storage media.

Still other aspects may be realized through a method for a computer system to display information regarding data storage in the computer system that corresponds to a state of the computer system on a user specified date. The method may include receiving data in the computer system; indexing the data according to the date the data was originally received; storing the data into a first storage media and a second storage media, the first storage media limited to indexing information of the data and the second storage media storing substantive data that corresponds to the indexing information; specifying a date on which to view the state of the computer system; and retrieving, from the first storage media, the stored data that correspond to the state of the computer system on the specified date, each of the retrieved data including display of an option to retrieve the substantive data, if any, from the second storage media. In this embodiment, the method may also include selecting the option to retrieve the substantive data to thereby transfer data associated with the indexing information from the second storage media to the computer system.

Other aspects of the present invention will become apparent with further reference to the drawings and specification which follow.

BRIEF DESCRIPTION OF THE DRAWINGS

In one embodiment of the present invention, certain aspects may be realized when data retrieval of an object or small collections of objects take only a small fraction of the time taken by traditional storage methods. Also, users may be allowed to view, in detail, exactly what objects are available for restore and their attributes at a given point-in-time. Users can also search for objects based on their attributes before choosing to retrieve them. All browsing and restoring of data is done without compromising availability of the Microsoft Exchange database.

Archival, retrieval, and indexing of Microsoft Exchange data as distinct end-user recognizable objects (such as an email message) with ability to browse these objects is enabled using certain aspects of the present invention. Also enabled is browsing of data at a user defined point-in-time, viewing different versions of the same object backed up at different points-in-time, and pattern searches in a logical view that the users are familiar with. Also enabled is the retrieval of objects backed up from one Microsoft Exchange database to a different target Microsoft Exchange target database.

DETAILED DESCRIPTION OF THE PREFERRED EMBODIMENTS

Figure 1:
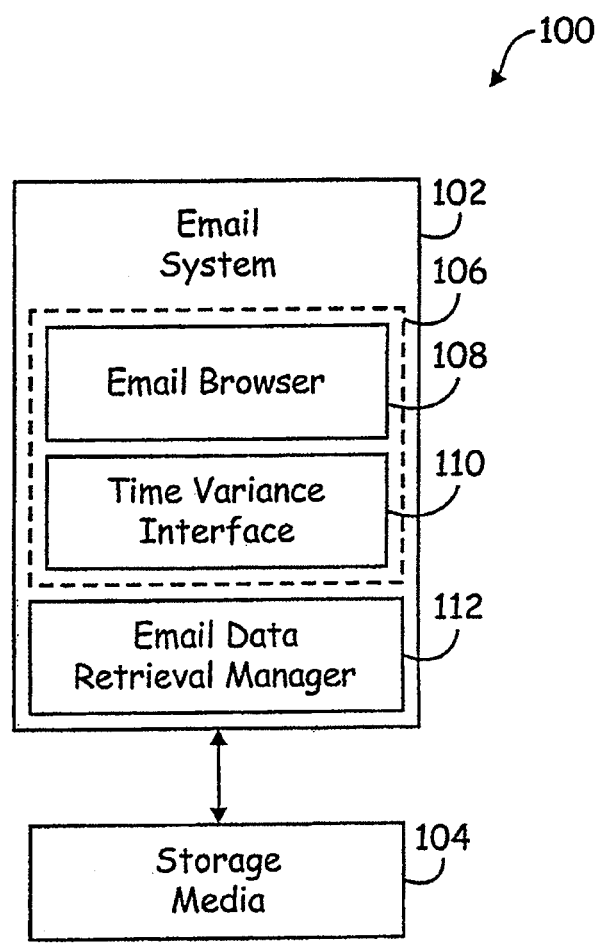
FIG. 1 is a block diagram of an exemplary embodiment of a data and storage management system built in accordance with principals of the present invention.

FIG. 1 is a block diagram of an exemplary embodiment of a data and storage management system 100 built in accordance with principals of the present invention. The data and storage management system 100 includes an e-mail system 102 that communicates with storage media 104 to access and store e-mail that is received in or sent from the e-mail system 102. The e-mail system 102 includes a retrieval application 106 that has an e-mail browser 108 and a time variance interface 110 for interfacing with an e-mail data retrieval manager 112. The e-mail data retrieval manager 112 interfaces with the storage media 104 to access e-mail that has been received in the e-mail system 102.

The data and storage management system 100 allows a user to access e-mail from the storage media 104 in numerous manners including accessing e-mail from a particular date such that the e-mail browser 108 appears as though it is operating on a given date and time other than the current date and time. Thus, if the user desires to view the system in the past, the user may see the e-mail system 102 as it existed at any time.

Figure 2:
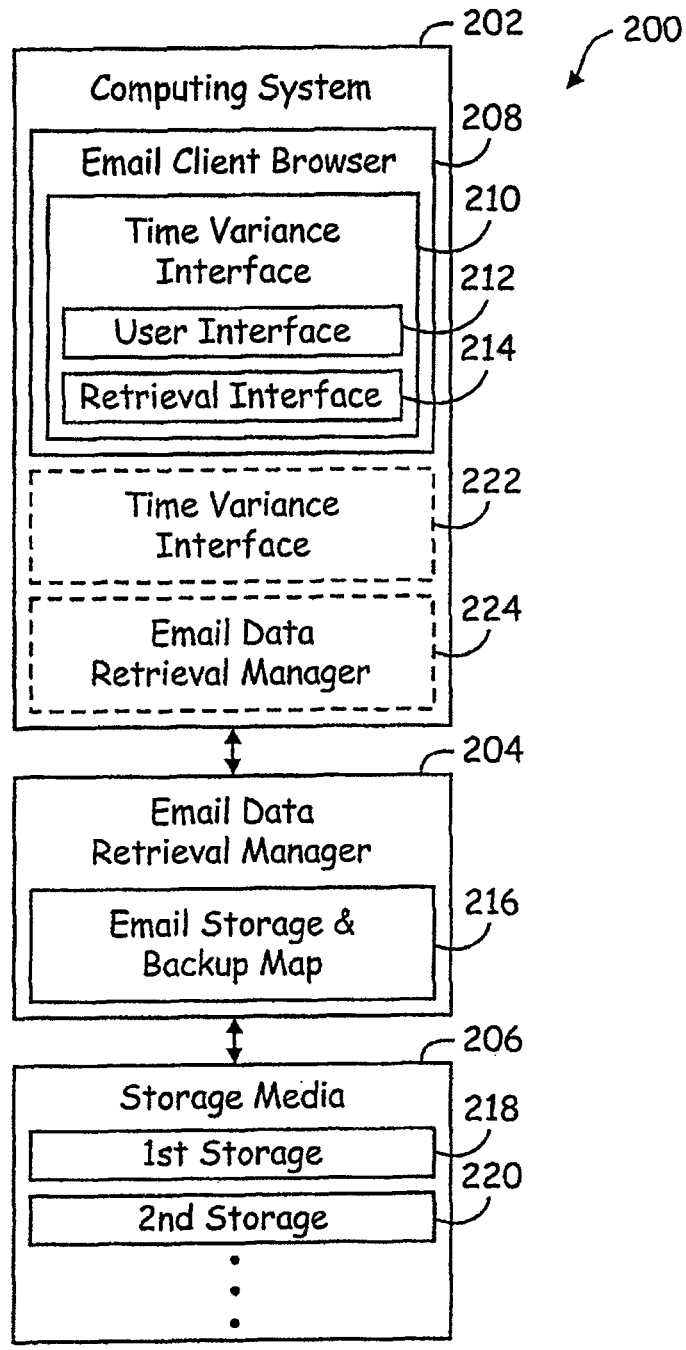
FIG. 2 is a block diagram of an exemplary data and storage management system.

FIG. 2 is a block diagram of an exemplary data and storage management system 200. The data and storage management system 200 includes a computing system 202 that interacts with an e-mail data retrieval manager 204 to retrieve and store messages from storage media 206.

The computing system 202 includes an e-mail client browser 208 that includes a time variance interface 210. The time variance interface 210 includes a user interface 212 and a retrieval interface 214. The retrieval interface 214 interacts with the e-mail data retrieval manager 204 and accesses information according to directions found in an e-mail storage and backup map 216. The e-mail storage and backup map 216 includes information that allows the retrieval interface 214 to assist the e-mail client browser 208 in retrieving data from the storage media 206. The storage media 206 includes numerous types of storage media which are labeled as a first storage media 218 and a second storage media 220. Of course, many more instances of storage media could exist on the storage media 206 as indicates by the dots representing continued storage media.

The dashed lines in FIG. 2 indicate optional variations and additions to the data and storage management system 200. For example, a time variance interface 222 may be included in the computing system 202 to assist in retrieval of e-mail messages. Also, an e-mail data retrieval manager 224 may be included to alleviate some of the processing that would otherwise take place at the e-mail data retrieval manager 204.

Figure 3:
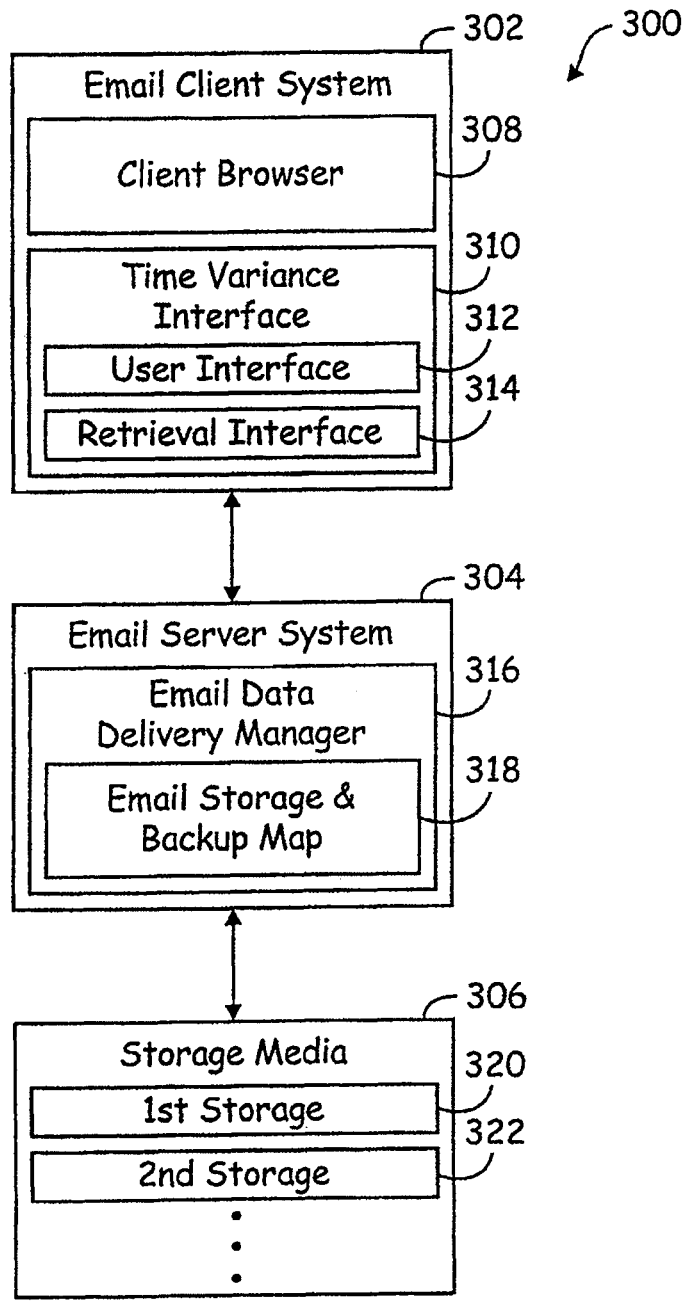
FIG. 3 is a block diagram of an exemplary embodiment of another data and storage management system.

FIG. 3 is a block diagram of an exemplary embodiment of another data and storage management system 300. The data and storage management system 300 includes an e-mail client system 302, an e-mail server system 304, and storage media 306. The e-mail client system 302 includes a client browser 308 and a time variance interface 310. The time variance interface 310 includes a user interface 312 and a retrieval interface 314.

The e-mail server system 304 includes an e-mail data delivery manager 316 which operates using an e-mail storage and backup map 318. The e-mail storage and backup map 318 directs the client browser 308 where to go in the storage media 306 to access an e-mail message. The storage media 306 includes numerous storage media, such as, a first storage media 320 and a second storage media 322. As indicated by the "..." more storage media may be added, as necessary, in the storage media 306 of the storage and management system 300.

Figure 4:
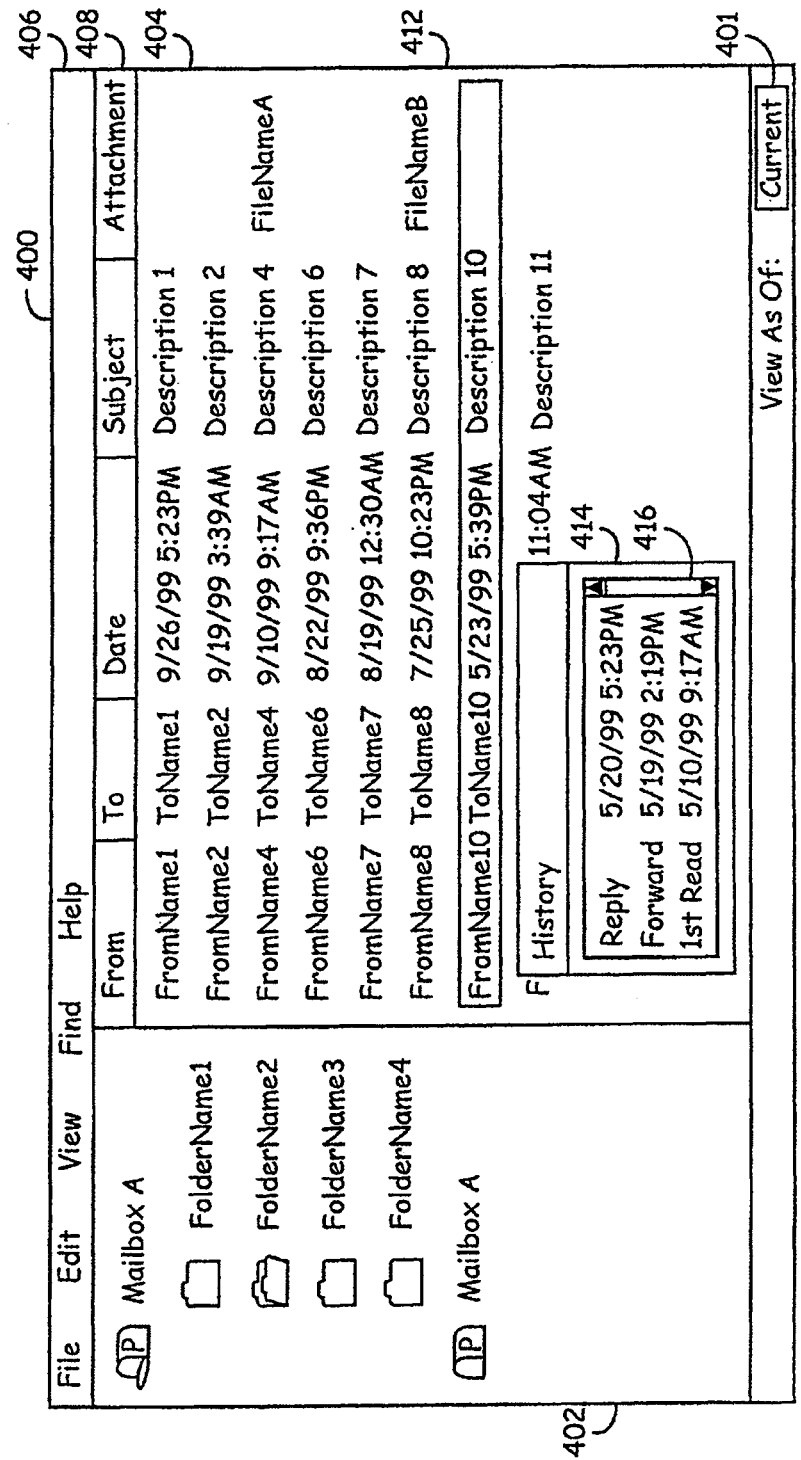
FIG. 4 is an exemplary e-mail browser that may operate in the data and storage management systems of FIGS. 1, 2, and 3.

FIG. 4 is an exemplary e-mail browser 400 that may operate in the data and storage management systems 100, 200, and 300. The e-mail browser 400 includes a "view as of" box 401 where a user may indicate the date of interest for viewing e-mail. As illustrated, the "view as of" box 401 is labeled current to represent the current date of the storage and retrieval system.

The e-mail browser 400 includes a mailbox/folder hierarchy 402 where mailboxes are shown as well as folders that may be accessed. The e-mail browser 400 also includes a message list 404 where each of the messages received in the system are listed. A toolbar 406 is illustrated across the top of the e-mail browser 400. The toolbar 406 includes standard Windows functions such as file, edit, view, find, and help.

The message list 404 includes a message list display selector 408 that allows a user to select which portions of a message to view in the e-mail browser 400. In the e-mail browser 400, the selections shown in the message list display selector 408 are the following: from, to, date, subject, and attachment.

A user may select a message to view as indicated by a selected message 412. When the user selects the message, the user may choose to view the history of the message and activate a history dialog box 414. The history dialog box 414 shows the different stages of the message such as the date the message was first read, forwarded, or replied to. If a user desires to view further states of the messages, the user may activate a scroll bar 416 to view more options for the e-mail message.

Figure 5:
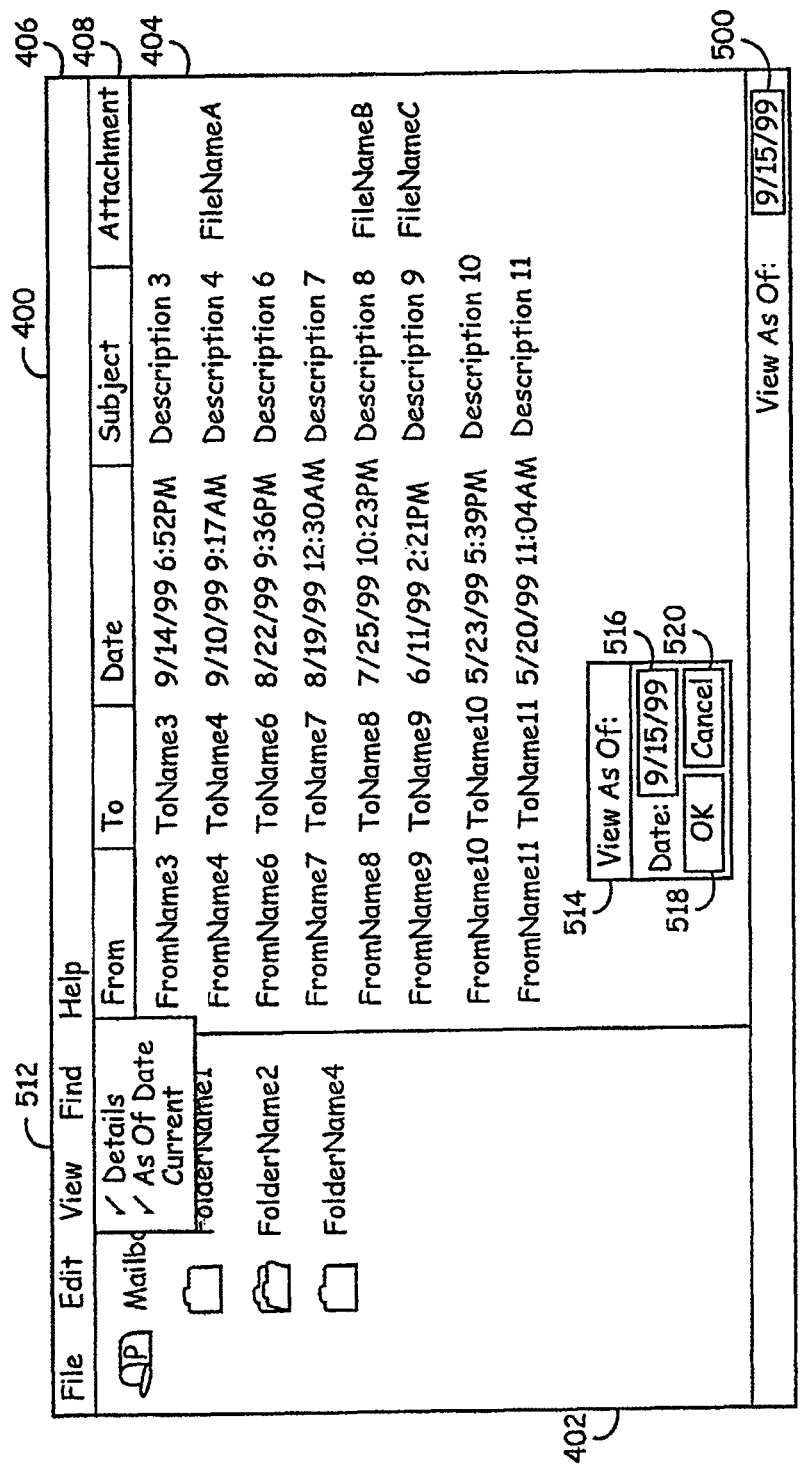
FIG. 5 is an exemplary diagram of the e-mail browser of FIG. 4 as it would appear when other options are selected by a user.

FIG. 5 is an exemplary diagram of the e-mail browser 400 as it would appear when other options are selected by a user. Specifically, a user may choose a different date to view the e-mails as illustrated in a "view as of" box 500 where the date "Sep. 15, 1999" has been selected by the user.

Selection of the "Sep. 15, 1999" date alters the mailboxes and folders that appear in the mailbox/folder hierarchy 402. As illustrated, only one mailbox appears and not all folder names appear that appeared when the "view as of" date was selected to be "current". Also different in FIG. 5, are the messages that appear in the message list 404. Only messages that were received prior to Sep. 15, 1999, are illustrated in the message list 404. The toolbar 406 and the message list display selector 408 are both identical to the e-mail browser 400 as previously illustrated.

When a view menu 512 is selected, a user may choose which options they desire for their particular needs of the e-mail browser 400. A "view as of" box 514 may be activated by the user and a date box 516 appears which the user can use to enter the date of interest in the e-mail browser 400. After the date has been selected, the user may enter the date into the system by pressing an okay button 518. If the user decides to exit the "view as of" box 514 without making changes, the user can press a cancel button 520.

Figure 6:
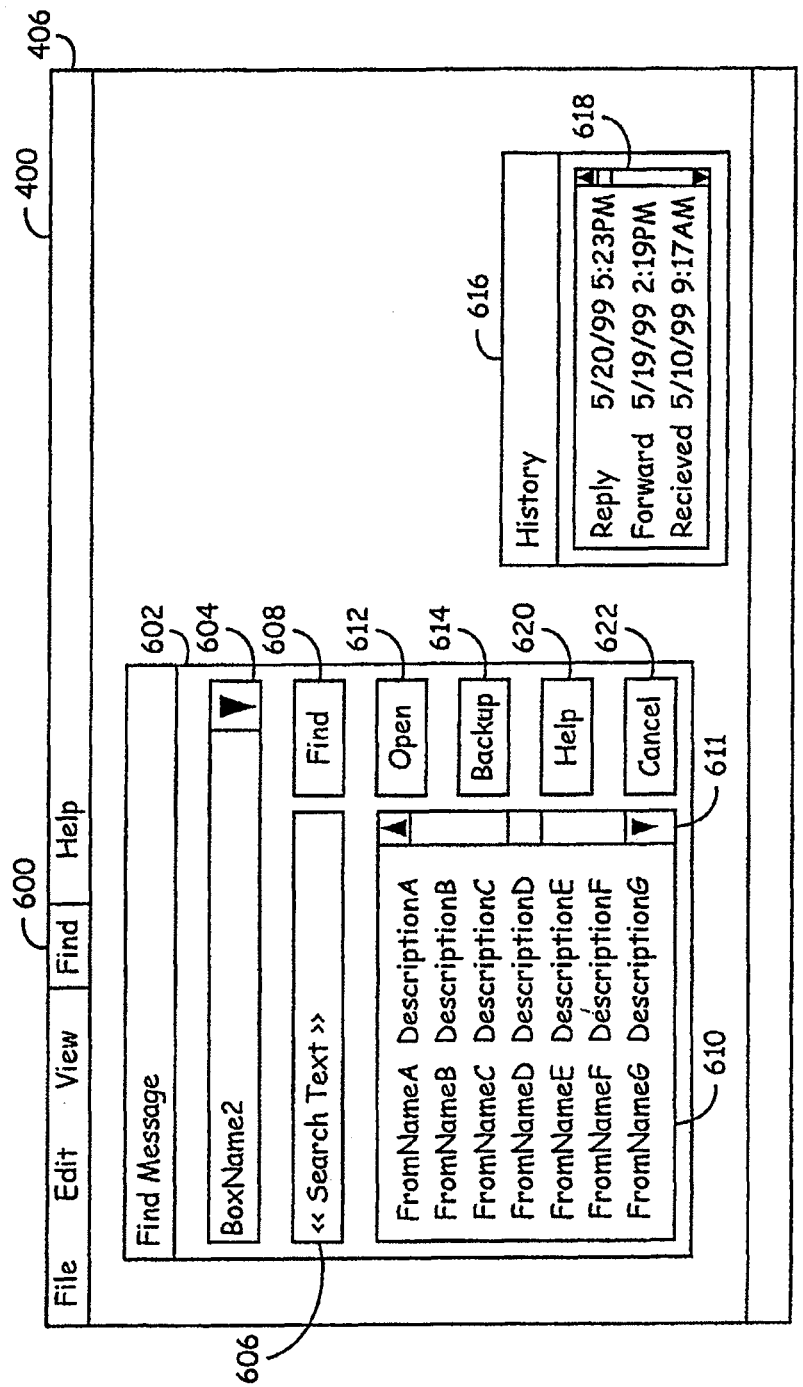
FIG. 6 is an exemplary illustration of the e-mail browser of FIG. 4 as it may be used to find particular messages in the data and storage management systems of FIGS. 1, 2, and 3.

FIG. 6 is an exemplary illustration of the e-mail browser 400 as it may be used to find particular messages in the data and storage management systems 100, 200 and 300. A find menu 600 may be selected by the user from the toolbar 406 and a find message dialog box 602 may be selected to appear on the e-mail browser 400. The find message dialog box 602 includes a boxname selector box 604 where the user can select which mailbox they would like to perform the search in. A search text box 606 is available for the user to enter particular terms of the message for which they would like to search. Of course, the search terms can include wild cards or other custom text for which to find. Upon entry of the search text in the search text box 606, the user presses a find button 608 which causes a search to be performed and all messages which are found appear in a message list 610. The user may use a scroll bar 611 to find the particular message of interest. Upon finding the particular message of interest, the user may press an open button 612 to view the message. The user may also press a backup button 614 to view the usage history of the particular message of interest. When the backup button 614 is pressed, a history box 616 appears and the history of the selected message appears. A scroll bar 618 is available for the user to scroll through the messages if the list goes beyond the bounds of the history box 616. As with typical Windows applications, a help button 620 is available for the user to press when in need of help using the find message dialog box 602. The user may also press a cancel button 622 to exit the find message dialog box 602.

Figure 7:
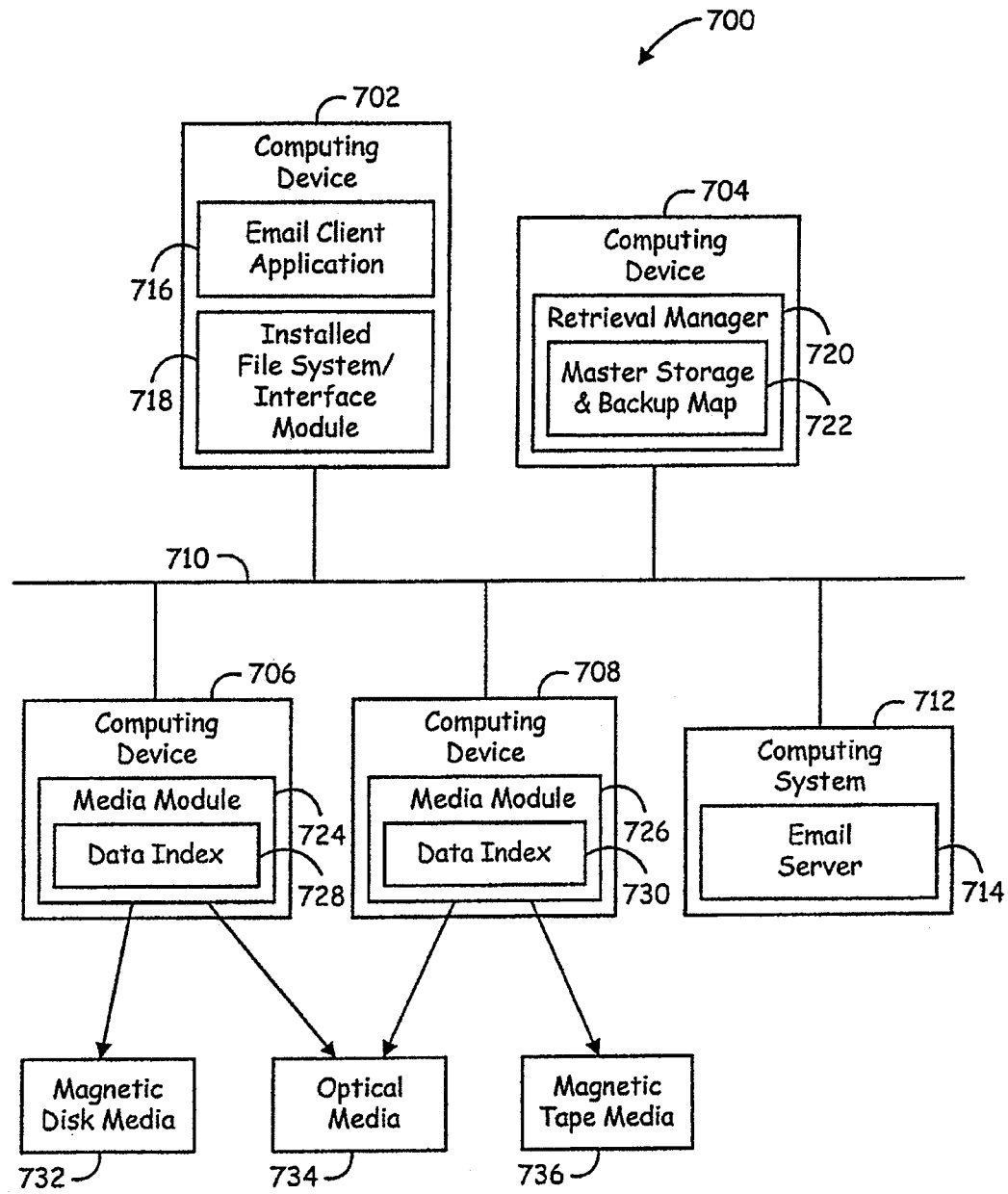
FIG. 7 illustrates an exemplary embodiment of a data and storage management system.

FIG. 7 illustrates an exemplary embodiment of a data and storage management system 700. The data and storage management system 700 includes computing devices 702, 704, 706, and 708 which interact across a network 710, such as an Ethernet network. A computing system 712 is also available to interact with the computing devices 702-708. The computing system 712 includes an e-mail server 714 for receiving and sending e-mails to and from the data and storage management system 700.

When the data and storage management system 700 is in operation, an e-mail client application 716 on the computing device 702 may request to view an e-mail message. Installed file system/interface module 718 interacts with a retrieval manager 720 of the computing device 704. The retrieval manager 720 includes a master storage and backup map 722 that directs the request to one of the computing devices 706 and 708. At the computing devices 706 and 708, respective media modules 724 and 726 exist to help the retrieval request know where the desired message is located. For further assistance in locating the desired message, the media module 724 and 726 include respective data indexes 728 and 730. In this manner, the e-mail client application 716 is able to request a message and the message is retrieved from one of the storage media, i.e., magnetic disk media 732, optical media 734, or magnetic tape media 636.

Of course, the storage media illustrated in FIG. 7 is exemplary storage media and additional storage media could be used while the data management scheme is continually tracked by the media modules 724 and 726 of the data and storage management system 700.

Figure 8:
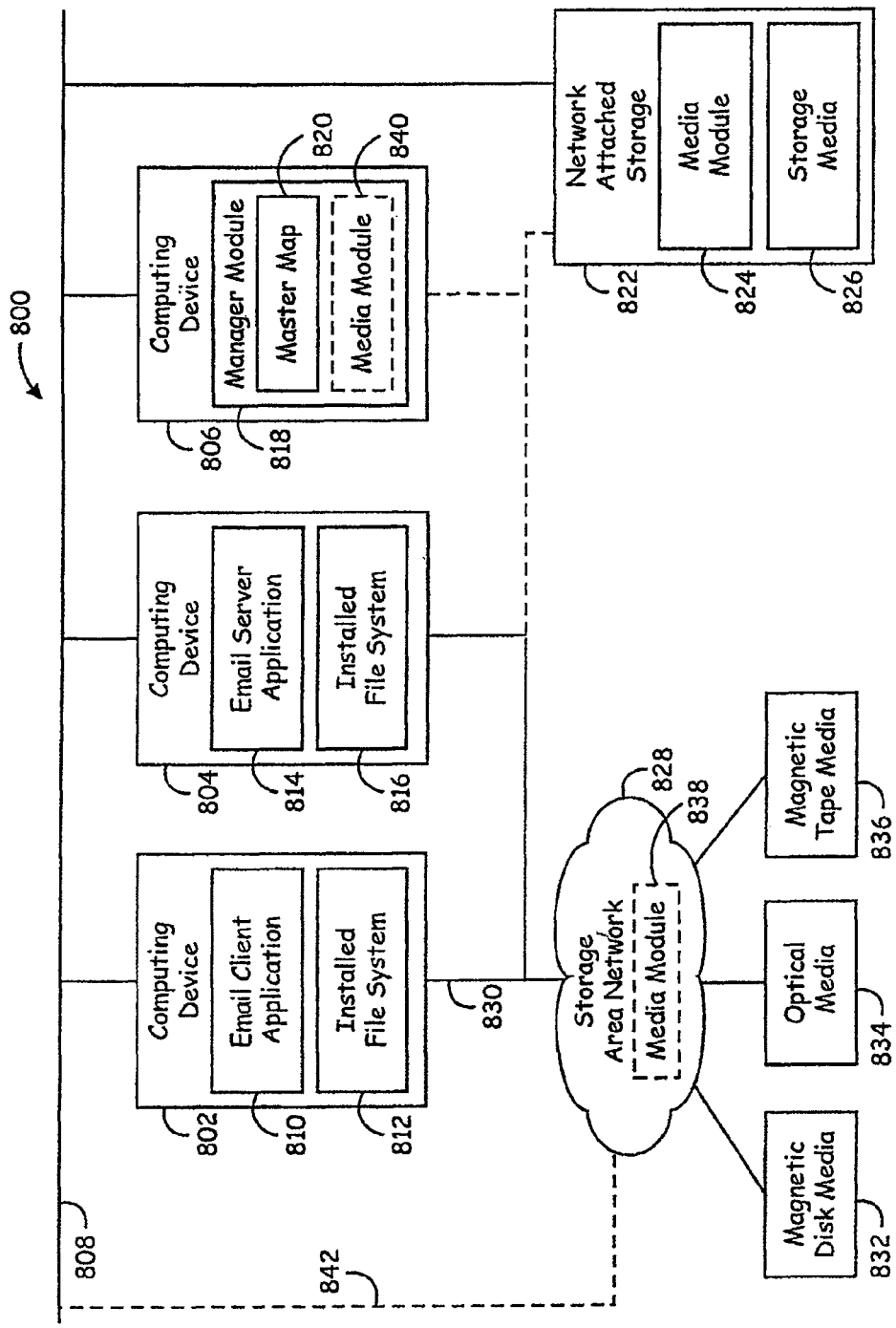
FIG. 8 illustrates an exemplary embodiment of another data and storage management system.

FIG. 8 illustrates an exemplary embodiment of a data and storage management system 800. The data and storage management system 800 includes computing devices 802, 804, and 806 which communicate across a network 808, such as an Ethernet network. An e-mail client application 810 is illustrated in the computing device 802 and may request to view an e-mail message through an installed file system 812. Similarly, an e-mail server application 814 operates on the computing device 804 and interacts with an installed file system 816. The computing devices 802 and 804 commonly interact with the computing device 806 across the network 808 where a manager module 818 is accessed and a master map 820 is available to retrieve more detailed information on the location of messages in the data and storage management system 800. If the e-mail client application 810 has requested an e-mail, the installed file system 812 may interact with a network attached storage 822 where a media module 824 interacts with storage media 826 to retrieve the desired e-mail message requested by the e-mail client application 810.

Alternatively, the installed file system 812 may interact with a storage area network 828 across a network 830, the network 830 commonly being a high speed fibre network. The storage area network 828 makes accessing storage media such as magnetic disk media 832, optical media 834, and magnetic tape media 836 available without significant processing in the computing device 802. To find the exact location or the message, a media module 838 (shown in dashed lines to represent the optional nature of it's location within the storage area network 828) may be used to locate the message. In addition, a media module 840 shown in dashed lines may be available to find the exact location of the message. Also shown in dashed lines is an extension of the network 830 where the network attached storage 822 may include a high speed connection with the computing devices 802, 804, and 806. Finally, the storage area network 828 may communicate directly with the network 808 as indicated by dashed lines 842.

As those skilled in the art will understand upon viewing the present disclosure, certain aspects of the invention may be integrated with other applications (such as document management systems, workflow management systems, etc.) that have been built a top of Microsoft Exchange which allows end users of such systems to access their data transparently across time and versions.

What is claimed is:

1. A method for accessing data on a user specified date, the method comprising:
   accessing with one or more computer devices, data stored in one or more storage media, wherein the data is associated with one or more folders and wherein the one or more folders comprise one or more objects;
   displaying based on the data stored in the storage media, a first folder hierarchy of the one or more folders as of a first date;
   receiving a second date that predates the first date; and
   upon receiving the second date, displaying based on the data stored in the storage media, a second folder hierarchy of the one or more folders as of the second date, wherein the second folder hierarchy has at least one folder that is different than the first folder hierarchy.

2. The method of claim 1, further comprising displaying the objects associated with the one or more folders of the first folder hierarchy.

3. The method of claim 1, wherein upon receiving the second date, displaying one or more objects associated with one or more folder of the second folder hierarchy.

4. The method of claim 1, additionally comprising indexing data associated with the one or more objects according to the date the one or more objects was originally received.

5. The method of claim 1, further comprising:
   storing in storage media, index information of the objects; and
   storing in a second storage media, substantive data that corresponds to the index information.

6. The method of claim 1, wherein receiving the second date comprises receiving the selection of the date from a user through a graphical user interface.

7. The method of claim 1, additionally comprising providing through a user interface a usage history of at least a selected one or more objects.

8. The method of claim 1, wherein a user interface comprises a scroll bar that displays additional history of the one or more objects.

9. A system for accessing data on a user specified date, the method comprising:
   one or more a storage media that stores information about one or more folders comprising one or more objects; and
   at least one computer device executing a user interface, wherein the user interface is configured to display based on the information stored in the storage media, a first folder hierarchy of the one or more folders as of a first date and in response to receiving a second date that predates the first date, the user interface is configured to display based on the information stored in the storage media, a second folder hierarchy of the one or more folders as of the second date, wherein the second folder hierarchy has at least one folder that is different than the first folder hierarchy.

10. The system of claim 9, wherein the user interface is further configured to display the one or more objects associated with the one or more folders as of the first date.

11. The system of claim 9, wherein the user interface, upon receiving the second date, is configured to display the one or more objects associated with the one or more folders as of the second date.

12. The system of claim 9, wherein a first storage media is configured to store indexing information about the objects, and wherein a second storage media is configured to store substantive data about the indexing information.

13. The system of claim 9, wherein the user interface displays a usage history of a selected one of the one or more objects.

14. The system of claim 9, further comprising an index of data associated with the one or more objects according to the date the one or more objects was originally received.

15. The system of claim 9, wherein the user interface provides a usage history of at least a selected one of the one or more objects.

16. The system of claim 9, wherein the user interface comprises a scroll bar that displays additional history of the one or more objects.

* * * * *

UNITED STATES PATENT AND TRADEMARK OFFICE
CERTIFICATE OF CORRECTION

PATENT NO. : 8,725,964 B2  
APPLICATION NO. : 13/606584  
DATED : May 13, 2014  
INVENTOR(S) : Anand Prahlad et al.

Page 1 of 1

It is certified that error appears in the above-identified patent and that said Letters Patent is hereby corrected as shown below:

In column 2 (page 3, item 56) at line 33, Under U.S. Patent Documents, above "6,742,092 B1  5/2004  Huebsch et al." insert --6,704,933 03/2004 Tanaka et al.--.

In column 2 (page 6, item 56) at line 43, Under Other Publications, change "Hierarchial" to --Hierarchical--.

Sheet 6 of 8 (Reference Numeral 618, Fig. 6) at line 3, Change "Recieved" to --Received--.

In column 2 at line 21, Change "data." to --data,--.

Signed and Sealed this
Tenth Day of May, 2016

Michelle K. Lee
*Director of the United States Patent and Trademark Office*